[19] United States Patent
Clough

[11] Patent Number: 4,929,218
[45] Date of Patent: May 29, 1990

[54] CONTINUOUSLY VARIABLE TRANSMISSION

[76] Inventor: Robert L. Clough, 44 Rochman Blvd., Scarborough, Ontario, Canada, M1H 1S2

[21] Appl. No.: 383,017

[22] Filed: Jul. 21, 1989

[51] Int. Cl.⁵ .............................................. F16H 9/00
[52] U.S. Cl. ..................................... 474/83; 474/101; 474/111
[58] Field of Search ..................................... 474/83-88, 474/101, 109, 111, 153, 155

[56] References Cited

U.S. PATENT DOCUMENTS 3,869,138  3/1975  Allison ........................... 474/111 X
3,964,331  6/1976  Oldfield ........................... 474/111 X
4,683,962  8/1987  True ................................ 474/101 X

OTHER PUBLICATIONS

Popular Mechanics, Jun. 1984, p. 70 and following: "Get Ready for a New Kind of Automatic Transmission"; Michael Lamm.
Popular Science, date unknown, p. 62: "Japanese-Style Continuously Variable Transmission"; Walter Miller.

Primary Examiner—Thuy M. Bui
Attorney, Agent, or Firm—Riches, McKenzie & Herbert

[57] ABSTRACT

A continuously variable transmission in which a chain is capable of changing width in order to be accommodated on fixed conical pulley surfaces at desired varying radii on the pulleys, commensurate with desired gear ratio. The chain is comprised of individual links whose widths can be varied and locked at different widths. The links are locked into position when the chain is bent in one direction and become unlocked when the chain is bent in the other direction. Idle gears are provided to introduce the chain to the pulleys tangential to arcs about the pulley and at desired radius from the pulley center. The idler gears bend the chain in appropriate directions to unlock or lock the chain links at desired widths depending upon the location where the links engage the pulleys.

12 Claims, 5 Drawing Sheets

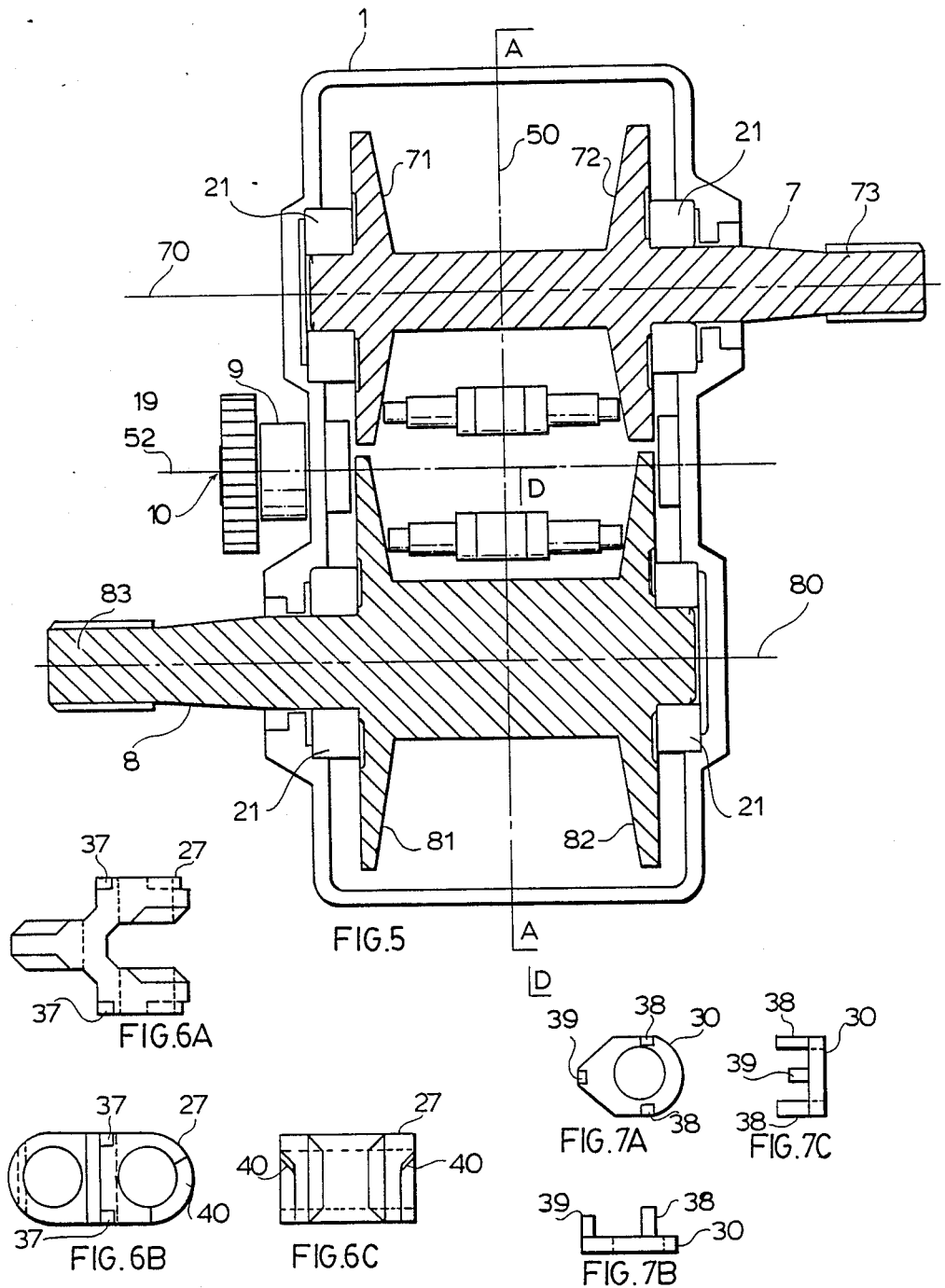

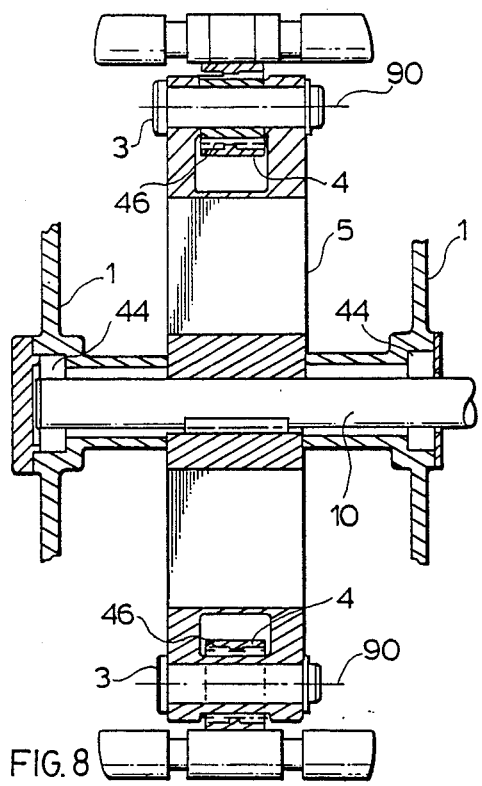
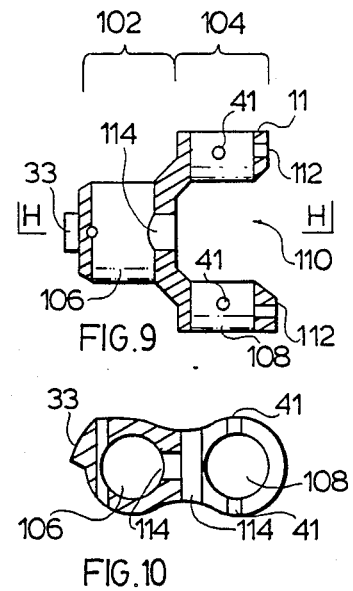
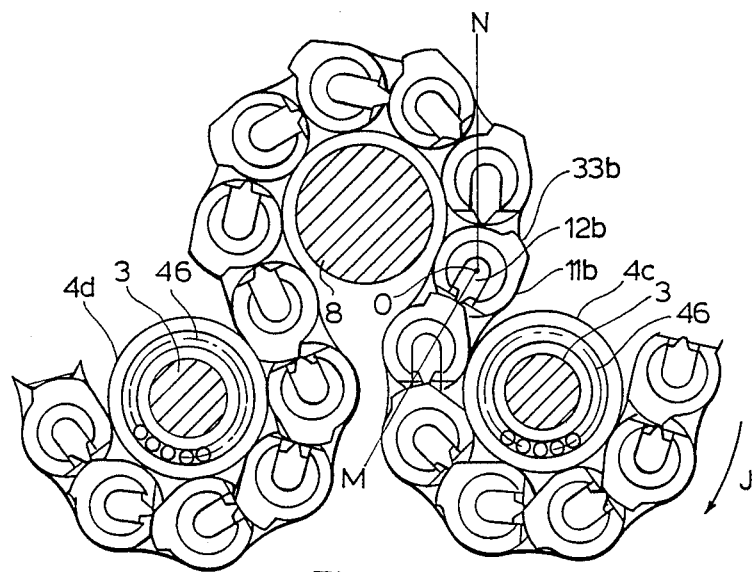
FIG. 8
FIG. 9
FIG. 10
FIG. 11

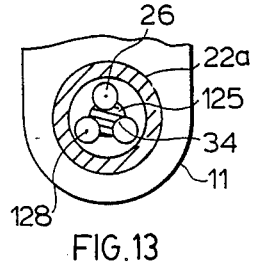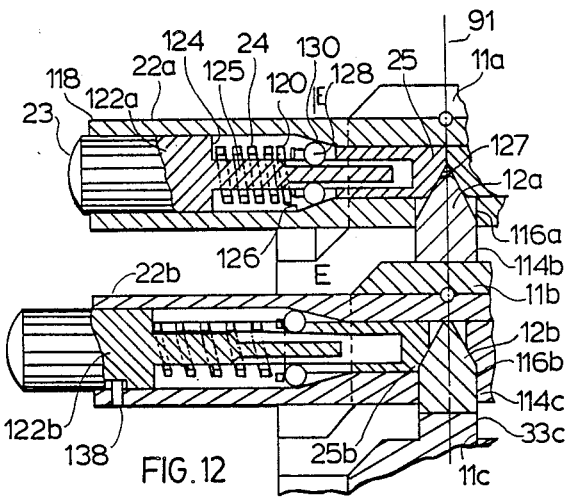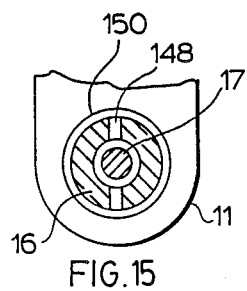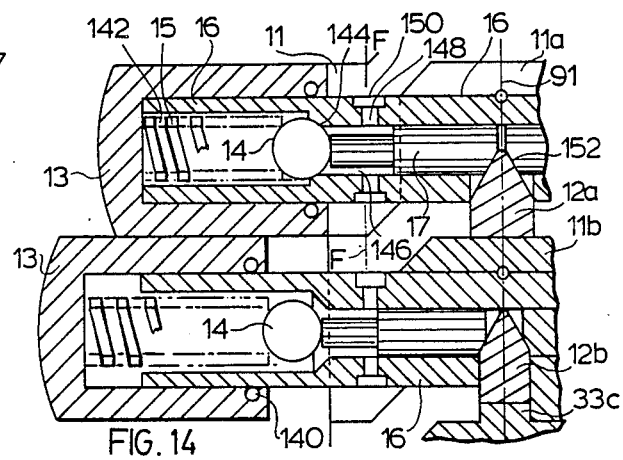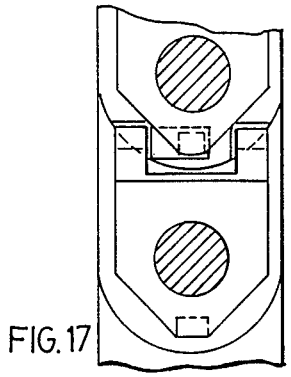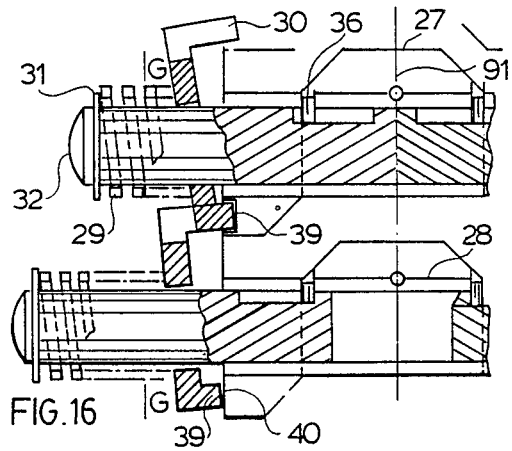

CONTINUOUSLY VARIABLE TRANSMISSION

SCOPE OF THE INVENTION

This invention relates to a continuously variable power transmitting device, which can change the ratio of speeds of the output shaft and the input shaft in a stepless manner, and achieve a multiplication of torque commensurate with the ratio selected.

BACKGROUND OF THE INVENTION

The ability to be able to accomplish continuously variable power transmission is extremely desirable in many power applications, but mainly in the automotive field where its introduction would provide advantages including a considerable increase in fuel economy, a large increase in engine braking ability, the potential of using a constant speed engine resulting in lower exhaust emissions, and the availability of a greater range of high to low ratio. Variable ratio drives of a mechanical nature have been available for industrial use involving relatively small horse powers for many years Efforts have been made to use these same devices on automobiles, but without success, primarily because of the high torques and wide range of speeds associated with the internal combustion engine.

The more recent designs have consisted of adjustable conical pulleys connected by means of a metal belt which, together transmit power by utilizing metallic traction, that is the engaging surfaces are pressed together to the extend that all lubrication is excluded, and the coefficient of friction approaches unity. However, these designs fail to achieve this condition, because the pulleys, whose two halves slide on a splined shaft and are located by mechanical or hydraulic means, display insufficient rigidity. Also, especially at extreme ratios, the arc of contact being the arc over which the belt engages a pulley at any one time and which determines the power transmitting capability of all belt and pulley systems, becomes minimal, resulting in slippage.

SUMMARY OF THE INVENTION

To at least partially overcome the disadvantages of known designs and particularly the lack of rigidity of the pulleys and the small arc of contact, the present invention provides a continuously variable transmission in which the belt or chain is capable of changing width in order to be accommodated on fixed conical pulley surfaces at desired varying radii on the pulley, commensurate with desired gear ratio.

The present invention permit each pulley to be made from a solid piece of metal. Means to change the width of the belt at varying locations provide the means to vary the gear ratio. Preferrably idler gears can be provided which introduce the chain to the pulleys tangential to arcs thereabout at desired radius from the pulley center and thereby fix the width of the belt and gear ratio. Advantageous use of idler gears provides a large arc of contact simultaneously on both pulleys.

With use of a chain having variable width, and means to lock the chain at varying width, the present invention provides for changing the width of a chain as the chain passes from one pulley to the other. Preferably, the width of the chain is locked at an appropriate width after reaching a first tangent point on a pulley, maintaining this width until leaving the pulley at a second tangent point with the chain assuming a maximun width on leaving the pulley at the second tangent point.

In one of its aspects the present invention provides a continuously variable transmission comprising:

two pulley members each having opposed conical contact surfaces, the pulley members rotatably journalled about spaced parallel axes, closed-loop chain means passing about the pulleys with one pulley driving the other pulley by side contact surfaces of the chain means being engaged between the opposed contact surfaces of each pulley, the chain means having a width between its side contact surfaces which can be varied over its length, releasable locking means to lock the chain means at a desired width while it is engaged about each pulley, control means to vary the desired width at which the locking means locks the chain means for engagement of the one pulley and to vary the desired width at which the locking means locks the chain means for engagement of the other pulley, wherein with changes in the widths at which the chain means is locked as it engages the pulleys, the chain means engages the pulleys at varing radii thereby changing the speed ratio at which the one pulley drives the pulley.

In another aspect the present invention provides a continuously variable transmission comprising:

two drive pulley members, a first of the drive pulley members journalled for rotation about a first axis, a second of the drive pulley members journalled for rotation about a second axis parallel to the first axis, spaced therefrom, each drive pulley member having a circumferential groove therein between opposing, conical pulley interior side contact surfaces which diverge away from each other with increased radius from the axis of each drive pulley member, the drive pulley members journalled on their axes with the groove of the first drive pulley member aligned with the groove of the second drive pulley member, closed-loop chain means passing about the drive pulley members received in the groove of each drive pulley member to frictionally engage each drive pulley member and couple the drive pulley members together, the chain means having side contact surfaces on opposite sides thereof, the chain means engaging each drive pulley member with the side contact surfaces on one side of the chain means in contact with the pulley interior side contact surface on one side of each groove and with side contact surfaces on the other side of the chain means in contact with the pulley interior side contact surface on the other side of each groove, means permitting adjustable variation of the width of the chain means between its side contact surfaces over the length of the chain means, releasable locking means to lock the width of the chain means over sections of the chain means in engagement with each drive pulley member, control means to vary the width at which the locking means locks the width of the chain means about each drive pulley member, wherein with variation of the width at which the locking means locks the width of the chain means about one drive pulley member, the side contact surfaces of the chain means engage the interior side contact surfaces of the one drive pulley member at varying radii from the axis of the one drive pulley member, and wherein by variation of the width at which the chain means is locked about one drive pulley member relative to the width at which the chain means is locked about the other drive pulley member, the relative speeds of rotation of the drive pulley members are varied.

In another aspect the present invention provides a continuous loop chain having a width between side contact surfaces which can be varied over the length of the chain, said chain means comprising:

link means interconnected by pin means for relative pivoting of adjacent link means about each pin means on curving of the chain in one or another direction, the pin means including extendible members which are slidably extendible axially with respect to the pin means to increase or decrease the width of the chain means with outermost surfaces of the extendible members comprising the side contact surfaces of the chain means, locking means releasably locking the extendible members relative to the pin means, biasing means biasing the locking means to assume a locked relation, and a cam element on each link means which when one link means is pivoted relative to an adjacent link means when the chain means is curved in one direction displaces the locking means against the bias of the biasing means to unlock the extendible members.

BRIEF DESCRIPTION OF THE DRAWINGS

Further aspects and advantages of the present invention will occur from the following description taken together with the accompanying drawings in which:

FIG. 5 shows a cross-sectional end view taken through line B—B on FIG. 1;

FIG. 6a, 6b and 6c show in top plan, side elevation and end elevation views, respectively, a first embodiment of a minimum pitch chain link;

FIG. 7a, 7b and 7c show in top plan, side elevation and end elevation views, respectively, a sprag for use with the chain link of FIGS. 6;

FIG. 8 is cross-sectional end view taken through line C—C on FIG. 1;

FIG. 9 shows a plan view of a second embodiment of a minimum pitch chain link;

FIG. 10 shows a cross-sectional side view through line H—H on FIG. 9;

FIG. 11 shows a part cross-sectional elevation view on line D—D of FIG. 5 with a chain having links as shown in FIG. 12 shown thereon;

FIG. 12 is a half-sectional view along line MNO in FIG. 11 showing a first embodiment of a chain utilizing the link of FIG. 9;

FIG. 13 is a partial-sectional view through line E—E on FIG. 12;

FIG. 14 is a half-sectional view similar to FIG. 12 longitudinally through a second embodiment of a chain utilizing the link of FIG. 9;

FIG. 15 is a partial-sectional view through line F—F on FIG. 14;

FIG. 16 is a half-sectional view similar to FIG. 12 through a third embodiment of a chain utilizing the link of FIGS. 6 and showing a linear clutch employing the sprag of FIGS. 7;

FIG. 17 is a partial-sectional view through line G—G on FIG. 16;

DETAILED DESCRIPTION OF THE DRAWINGS

Figure 1:
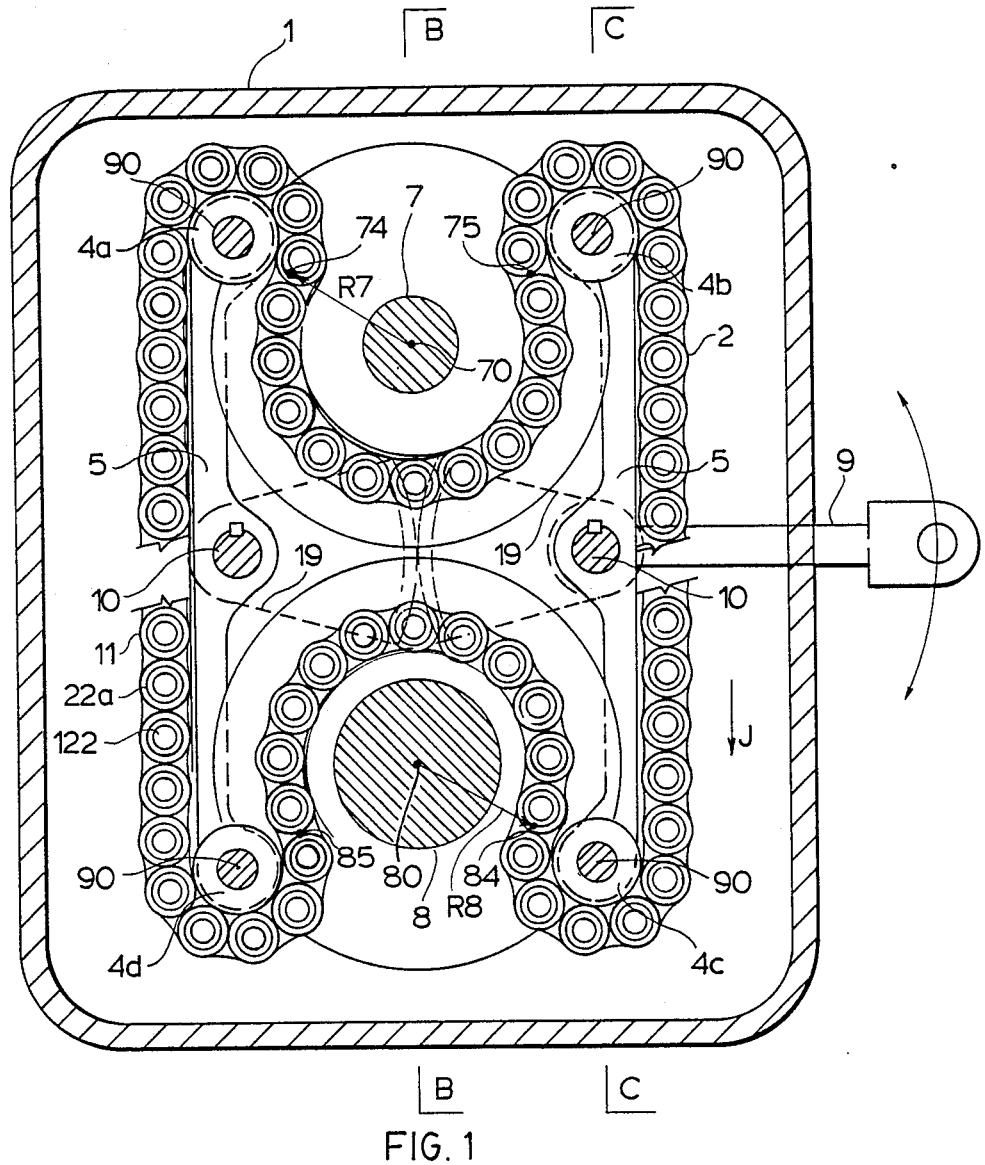
FIG. 1 is a schematic cross-sectional side view of a preferred embodiment of the present invention.

Reference is made first to FIGS. 1 and 5 showing integral input shaft and pulley 7 and integral output shaft and pulley 8 each mounted on their respective bearings 21 in a totally enclosing gear case 1, preferably to operate submerged in suitable oil, in the case of a hydraulic version or alternately adequately lubricated in the case of a mere mechanical version.

Drive pulleys 7 and 8 are thus journalled for rotation about parallel axes 70 and 80, respectively. Pulley 7 has interior, conical, side engagement surfaces 71 and 72 disposed symmetrically about a central line shown as 50. Pulley 8 has similar interior, conical side surfaces 81 and 82 disposed symmetrically about central line 50. In the preferred embodiment surface 71 forms part of a cone intersecting axis 70 at an identical angle to that at which surface 81 intersects axis 80.

Power from the prime mover may be transmitted to the input shaft at end 73 through a clutch (not shown). Power may be transferred from the output shaft via end 83.

As best seen in FIG. 1, two control arms 5 are journalled, one on each side, on control arm shafts 10 which are also mounted on bearings 44 in the gear case, on an axis 52 midway between axes 70 and 80 of the input and output shafts, parallel thereto, and equidistant from the vertical centre line 50. Shafts 10 are keyed to control arms 5, and extend through the gear case on one side, where, as shown on FIG. 1 they carry spur gear quadrants 19 which mesh with each other to ensure synchronous pivoting of each control arm 5 about their respective shafts 10.

One of the control arm shafts 10 has control lever 9 keyed thereto and it is by positioning of control lever 9 that the gear ratio may be continuously selected as desired. Preferably, while not shown, the control lever may be positioned in response to signals from a microprocessor which receives integrated information from the prime mover and the drive train.

Each end of both control arms 5 carry idler pulleys 4 (4a, 4b, 4c, and 4d) which are journalled via bearings 46 on shaftlike pin 3.

A chain, schematically shown as 2 in FIG. 1 is wrapped about the pulleys and idlers as shown on FIG. 1. Precise chain length is not critical nor is an increase in length due to wear.

Chain 2 is made up of a number of identical links 11 which are connected together by pins 22, the ends of which carry extendible slide members 122 at both ends, and make it possible to vary the width of the chain. A mechanism is provided to lock the extendible members at any position between minimum and maximum width.

The mechanism operates so that the extendible members become locked, upon the chain becoming sufficiently curved in one direction at a width they may occupy at the point where the chain becomes sufficiently curved in this one direction. Otherwise, that is, for example, when the chain may be straight or curved in the other direction, the extendible members are unlocked.

Springs may be provided in each pin member to constantly bias the extendible members outwardly towards the maximum width. When unlocked, the extendible members may, if unconfined, extend to their maximum width or may be confined or otherwise urged to assume any width desired. By confining the chain unlocked to assume a desired width and then curving the chain sufficiently to lock its width and maintaining the chain so curved, the chain may be locked at this desired width.

As seen in FIG. 1 with chain 2 moving in the direction indicated by arrow J as the chain extends about each pulley 7 or 8, the chain is bent counter-clockwise. While the chain extends about each idler pulley 4, it is bent clockwise. While the chain extends between idler pulleys on each side the chain is straight. A preferred chain is operative so that the width is locked when the chain is bent counter-clockwise and unlocked when the chain is bent clockwise. Transition between locked and unlocked position will occur at points 74, 75, 84 and 85 as seen in FIG. 1. The chain is not locked as it extends clockwise about idler pulley 4a, becomes locked as it is bent from clockwise to counter-clockwise at point 74 about pulley 7, and remains locked about pulley 7 until point 75 where the chain is unlocked as it is curved from counter-clockwise to clockwise about idler pulley 4b. The chain then extends staight from pulley 4b to 4c preferably unlocked and remaining unlocked while it curves clockwise about pulley 4c becoming locked at point 84 where it is curved counter-clockwise about pulley 8. The chain remains locked, at constant width about pulley 8 from point 84 to point 85 where it bent counter-clockwise at point 85 to become unlocked about idler pulley 4d.

The extendible members in each pin of the chain are selected so they can extend to contact the inside surfaces of the pulleys. The width at which chain 2 will be locked at point 74 will depend upon the width between side walls 71 and 72 of pulley 7 at point 84. With locking at this width, chain 2 will then pass around pulley 7 at constant radius $R_7$ from axis 70 corresponding to this width.

Movement of idler pulley 4a so as to vary the distance between axis 70 and axis 90 about which idler pulley 4a rotates will vary the width $W_7$ of the chain and thus the radius $R_7$ at which the chain will contact pulley 7.

Figure 2:
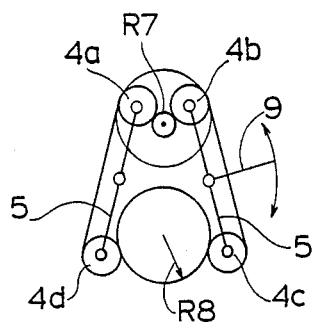
FIG. 2 is a schematic diagram showing the device of FIG. 1 to produce a reduction in speed from the driving pulley at the top to the driven pulley at the bottom.
Figure 3:
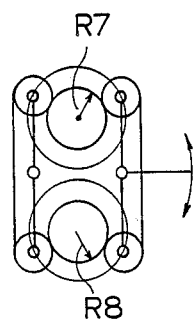
FIG. 3 is a schematic diagram showing the device of FIG. 1 to produce the same speed from the driving pulley at the top to the driven pulley at the bottom.

As shown in FIG. 1 and schematically shown in FIG. 3, the idler pulleys 4 have been positioned so that the distance between axis 70 and axis 90 of idler pulley 4a equals the distance between axis 80 and axis 90 of idler pulley 4c and therefore $R_7$ equals $R_8$, driving pulleys 7 and 8 at approximately 1:1 ratio. To assume the configuration shown in FIG. 2, lever 9 can be positioned so that idler pulleys 4a and 4b are symmetrically moved closer to pulley 7 decreasing radius $R_7$. Simultaneously pulleys 4c and 4d at the other ends of the control arms are symmetrically moved farther from pulley 8 increasing radius $R_8$. In FIG. 2 pulley 7 is driven faster than pulley 8 by reason of $R_7$ being greater than $R_8$.

Figure 4:
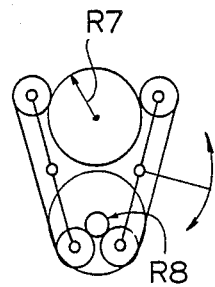
FIG. 4 is a schematic diagram showing the device of FIG. 1 to produce an increase in speed from the driving pulley at the top to the driven pulley at the bottom.

In the configuration shown in FIG. 4, control lever 9 is positioned so that idler pulleys 4a and 4b are spaced farther from pulley 7 and idler pulleys 4c and 4d closer to pulley 8 so that $R_7$ is greater than $R_8$. Suitable stepless positioning of control lever 9 will allow any given ratio between those illustrated in FIGS. 2 and 4.

When the extendible members of the chain are unlocked, the extendible members are preferably pushed outwardly to their maximum extent by biasing such as with compression springs Preferably, the maximum width of the chain will be slightly less than the maximum width of the space between the engagement surfaces of either pulleys 7 or 8 as measured at the outside diameter of each pulley. This allows the chain to enter the groove of each pulley between its contact surfaces before engaging the pulley. When the chain is unlocked the extendible members are free to be moved in by overcoming the pressure of the springs yet will resume the out positions when released. When the chain is curved from clockwise to counter-clockwise, the chain is locked rigidly at the width it held immediately prior to assuming the counter-clockwise curve.

Preferred constructions for the variable width chain will now be described.

The chain comprises identical links 11 coupled together by pins 22. Two links are joined by a pin 22 with the links pivotable with respect to each other about the pin. A cam element is carried by one link which engages a follower on the other link. The cam element is positioned so that depending on the relative rotation of the two links, the cam element will displace the follower to either lock or unlock the extendible member. Preferably, the cam element has camming surfaces whose radial extension from the axis of the pin towards the other link carrying the follower varies as the other link is pivoted about the axis of the pin relative to the link carrying the cam element.

Reference is now made to FIGS. 11 to 13. FIG. 11 comprises a schematic cross-section through a chain passing about pulley 8 and idler pulleys 4c and 4d. FIG. 12 is a half sectional view along line MNO on FIG. 11. FIG. 13 is a sectional view through line E—E on FIG. 12. The chain comprises a plurality of links 11 of the form illustrated in FIGS. 9 and 10, each having a front portion 102 and a rear portion 104. Front portion 102 has a bore 106 therethrough while rear portion 104 has a bore 108 therethrough. Rear portion 104 as seen in FIG. 9 has a major rearward extending slot 110 therein sized to receive the front portion of a following link between two side portions 112 of rear portion 104.

For convenience, in FIGS. 11 to 13 different pins and links and their elements are designated by the subscripts a, b or c. Referring to FIG. 12 a pin 22b extends through bore 108 in one side portion 112 of rear portion 104 of link 11b through bore 106 of the front portion 102 of a following link 11c and then through bore 108 in the other side portion 112 of rear portion 104 of link 11b in order to couple the links 11b and 11c together for pivoting relative to each other about the axis of pin 22b coaxially within bores 106 and 108. Pin 22b is preferably force fitted into bore 106 of pin 11c with bore 108 of pin 11b rotatably journalled on the pin. Alternately, pin 22b may be keyed to bore 106.

Each link 11 has a slot 114 extending from bore 106 into bore 108. Cam element 33 is provided as a protrusion from the front portion 102 of link 11. Cam element 33 is sized to be received in slot 114 and extend therein to varying depth depending on the angular positioning of links relative to each other about their connecting pin 22. Pin 22 is hollow and has a slot 116 through its wall of similar size to slot 114 of link 11 and aligned therewith.

A cam follower 12 is associated with each pin 22 slidable in slots 116 and 114 For example cam follower 12a is received in slot 116a of pin 22a and slot 114a of link 11b for slidable movement therein in a radial direction with respect to the axis of bore 106 of pin 11a and towards the axis of bore 108 of pin 11a. As will be described shortly, each cam follower 12 is biased by springs 24 for movement radially away from the axis of bore 106.

As seen in FIGS. 11 and 12, each cam element 33 interacts with an associated cam follower 12 so that when the chain is straight or it is curved clockwise, cam element 33 is disposed within slot 114 urging cam follower 12 fully into pin 22. Where the chain is curved counter-clockwise about pulley 8, cam element 33 becomes pivoted out of slot 114 and its cam follower is urged by spring 24 radially out of slots 116 and 114.

Movement of cam follower 12 in locking and unlocking of the extendible member to vary the chain width is best described with regard to FIG. 12. In FIG. 12 (and is also the case with similar FIGS. 14 and 16) only the left hand half of the cross-section is shown with the right hand halves about longitudinal center line 91 being mirror images. In FIG. 12, two pins 22 are shown with the lower pin 22b in an unlocked, fully extended position and the upper most pin 22a locked in an intermediate width position. In FIG. 12, three links are shown of which only the upper most link 11a is entirely shown. The lower two links 11b and 11c are shown only in part.

Pin 22 is seen as a hollow member with a cylindrical outer journaling surface 118. A co-axial bore 120 at each end carries slide members 122 axially slidable therein and presenting rounded end surface 23, suitably hardened to contact side surfaces of pulleys 7 and 8. Spring 24 about a central extension 125 of the side member acts at one end on shoulder 124 of slide member 122 and at the other end on an annular washer 126. The annular washer in turn acts on three balls 128 which are located in complementary sized, cut-away, longitudinally extending grooves 34 in extension 125 as seen in FIG. 13. Bore 120 is cylindrical over a major end portion but tapers to provide a conical surface 130 which balls 128 may engage. In a locked position, with outward movement of member 122 resisted by a side surface of pulley 7 or 8, spring 24 urges balls 128 into a jammed relation between conical surface 130 and central extension 125 to lock the slide member against movement further into pin 22, as in the manner of a one way linear clutch.

A clutch actuator member 25 is slidably received in a reduced radius, central cylindrical portion of pin 22 co-axially about extension 125 Clutch actuator 25 has a beveled central surface 127 complementary to a beveled surface on the follower 12 which the clutch actuator contacts. When a follower 12 is urged by its associated cam element 33 fully into pin 22, then actuator member 25 moves balls 128 against the bias of spring 24 to release slide member 122 from being locked by balls 128. For example, in FIG. 12, cam element 33c has urged follower 12b fully into pin 22b with follower 12b displacing actuator member 25b outward to unlock slide member 122b.

With slide member 122 at any position, withdrawl of follower 12 will cause spring 25 to force balls 128 into a jammed relationship locking slide member 122 and thereby locking the width of chain 2. For example in FIG. 12, follower 12a is withdrawn and slide member 122a is locked in position.

As seen in the lower most pin 22b of FIG. 12, a stop pin 138 may be provided to extend through the cylindrical walls of pin 22 into a longitudinal slot in slide member 122 to contact an end of this slot and limit the maximum amount slide member 122 may extend out of pin 22, thus determining the maximum width of the chain 2 and, as well, preventing rotation of slide member 122 relative to the rest of pin 22.

In practice, extendible slide member 122 presses compression spring 24 onto washer 126 and balls 128 which in turn are pressed against clutch actuator 25 which then pushes the cam follower 12 radially outwards for contact with cam element 33 of link 11.

Reference is now made to FIGS. 14 and 15 which shows a second embodiment of a variable width chain in accordance with this invention. The second embodiment of FIG. 14 utilizes the same links 11 and cam follower 12 as the first embodiment. However, for pins 22 of FIG. 12, pins 16 and their associated elements have been substituted.

Pins 16 utilize a hydraulic lock mechanism. Extendible slide members 13 comprise a hollow, cylindrical end cap co-axially slidable about pin 16 and having a groove near the end of the member to accept an O-ring type seal 140. Pin 16 has an outer bore 142 at its end which tapers to form valve seat 144 before becoming a smaller central bore 146 ported to the outside of the pin by radially extending port 148 open to circumferential groove 150. Groove 150 is in alignment with port 41 through side portions 112 of link 11, (as seen in FIGS. 9 and 10) via which hydraulic fluid may enter and exit bore 146.

Spring 15 is provided between extendible member 13 and a valve ball 14 to bias ball 14 into valve seat 144 to seal the same and hydraulically lock extendible member 13 in place. Beveled surfaces of cam followers 12 contact beveled faces 152 of valve actuators 17 axially slidably received in smaller bore 146 to unseat ball 14 and unlock the member 13. The embodiment of FIG. 14 is preferably used in a crank case which is totally filled with lubricating fluid.

Valve actuator 17 preferably slidably fits in the smaller bore 146 of pin 16 but has a diameter at its outer end which allows oil to flow therepast.

The closed outer end of extendible slide member 13 is contoured with a radius to satisfactory engage the conical surfaces of the pulley 7 and 8 and should be hardened. Member 13 may also be furnished with a retaining pin which will advantageously prevent its rotation.

In practice, member 13 presses spring 15 onto ball 14 which in turn presses valve actuator 17 biasing cam follower 12 radially outwardly for contact with cam element 33 of link 11.

A third embodiment of a pin locking device is shown in FIGS. 16 and 17 and utilizes link 27 and sprag 30 as shown in FIG. 6 and 7. A hollow chain pin 28 is in a sliding fit in the front end of link 27, and a pressed fit in the opposite end of link 27. Contact pins 32 are inserted co-axially in each end of chain pin 28 in which they are free to slide. Limit pins 36 are inserted to retain contact pins 32 in chain pin 28 and prevent relative rotation.

A sprag 30 is in a loose fit over each contact pin 32, followed by compression spring 29 which are secured by circlips 31. It can be seen from FIG. 6 that link 27 has two recesses 37 which accommodate the two legs 38 on sprag 30, shown on FIG. 7. On both sides of the front end of link 27, a face cam 40 is profiled, with which the cam follower leg 39 on sprag 30 makes contact. This contact is maintained by the pressure of compression spring 29. The two legs 38 of the sprag engage in two recesses 37 on link 23 and the cam follower leg 39 is in contact with, or is clear of the surface of the face cam 40 on the proceeding or succeeding link.

In practice, when the chain is straight or when rounding an idler, cam follower leg 39 on sprag 30 is in contact with the high point of the cam profile of face cam 40 on the face of the link to an extent that the angle of the sprag 30 relative to pin 32 is such that the pin is free to slide in the hole in the sprag, the hole being larger than the pin. This condition is illustrated in the bottom pin in FIG. 16.

When rounding pulley 7 or 8, cam follower leg 39 on sprag 30 slides down the face cam 40 and moves away from the face of the cam at the point where the angle of sprag 30 can no longer increase as it is now in contact with pin 32. The pin is no longer free to move inwards and forces placed on the pin by the face of pulley 7 and 8 is resisted by metallic traction between the sprag and pin.

The continuously variable transmission of this invention assists in ensuring that forces necessary to produce metallic traction are constrained in the pulleys and not carried by the gear case.

Gear ratios can be changed by the movement of control lever 9 which can be affected by air, hydraulic, electrical, mechanical or other actuator means, and initiated by signals from the power source, the drive train, or an integrated consensus of the two.

Control lever 9 is attached to control arm shaft 10, which also carries control arm 5 and gear quadrants 19. The control lever is only required on one of the control arm shafts although there are two control arm assemblies. The two gear quadrants 19 mesh together on the center line of the gear case in such a manner that when the control lever 9 is in a horizontal position, the two control arms 5 are in vertical position and parallel to each other, and any change in the angle of control lever 9 produces a similar change in the angles of control arms 5 but in opposite directions.

Idler pulleys 4 which are mounted on the extremities of control arms 5 cause the chain to engage and disengage the driven and driving pulleys at the radii necessary to produce the desired speed ratio. In practice, this ratio could constantly and automatically change in order to co-relate power available, with power required, resulting in a maximum efficiency of fuel consumption. It would also permit the use of a constant speed engine which has many desirable features including simplicity of manufacture and high thermal efficiency.

Figure 18:
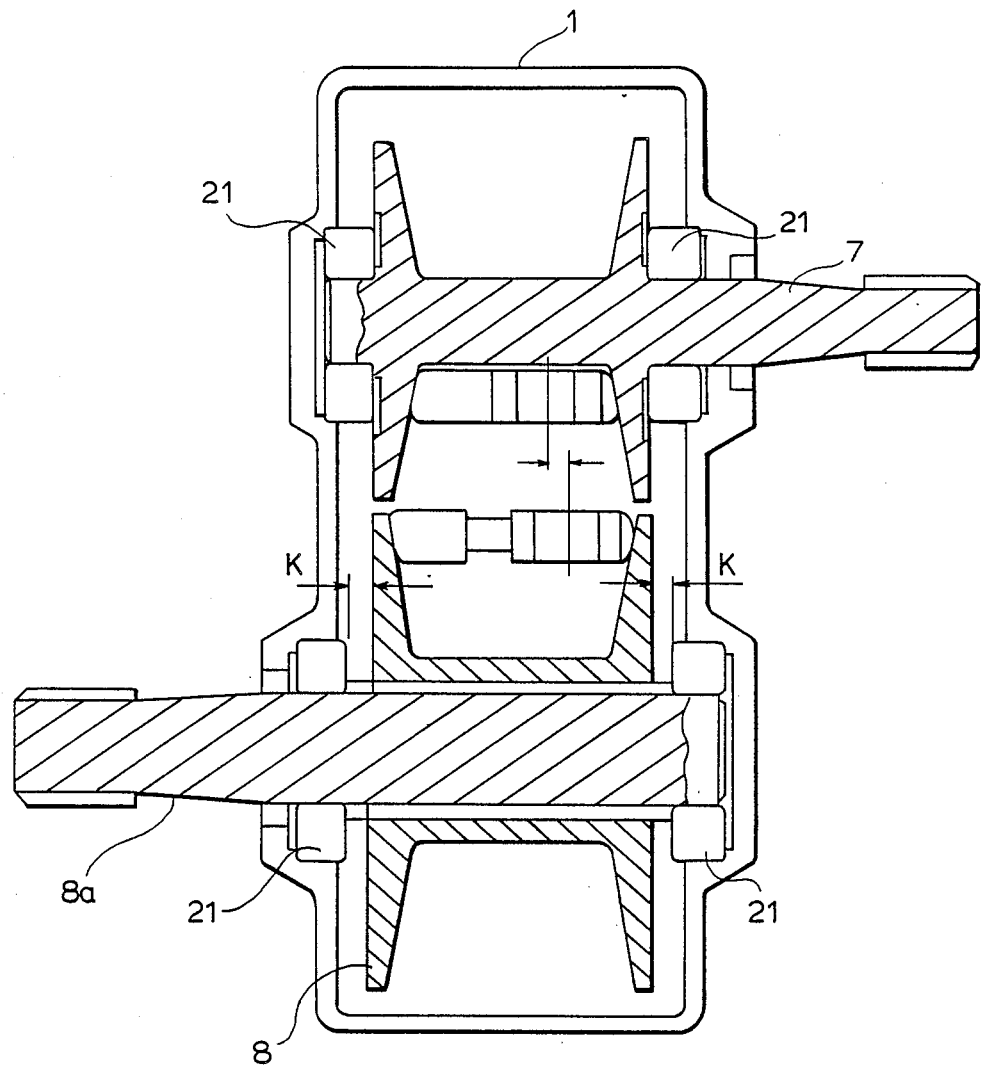
FIG. 18 shows a cross-sectional end view similar to that of FIG. 5 but of another embodiment utilizing a modified chain.

Preferred devices have been described with telescoping pins 11 or 16 on both sides of a chain. It is possible that extendible slide members may be provided on only one side of the chain with fixed pins on the other side. In this event, one of the pulleys, still preferably machined from one piece of steel, could be bored and splined in order that it could float axially on its shaft in order to centralize with the chain. Such an embodiment is shown on FIG. 18. FIG. 18 uses similar reference numerals to those in FIG. 1. In FIG. 18, pulley 18 is axially slidable on separate splined shaft 8a as indicated by arrows K.

As shown on FIG. 18, the driven and driving pulleys can be of different diameters in order to eliminate excessive ratios, or to introduce a desirable overdrive. In this case the cone angle of one of the pulleys could be changed to maintain the correct distance between the opposing faces of the pulley at radius determined by the required ratio.

While the invention has been described with reference to preferred embodiments it is not so limited. Many variations and modifications will now occur to those skilled in the art. For a definition of the invention reference is made to the appended claims.

What I claim is:

1. A continuously variable transmission comprising:
   two drive pulley members,
   a first of the drive pulley members journalled for rotation about a first axis,
   a second of the drive pulley members journalled for rotation about a second axis parallel to the first axis, spaced therefrom,
   each drive pulley member having a circumferential groove therein between opposing, conical pulley interior side contact surfaces which diverge away from each other with increased radius from the axis of each drive pulley member,
   the drive pulley members journalled on their axes with the groove of the first drive pulley member aligned with the groove of the second drive pulley member,
   closed-loop chain means passing about the drive pulley members received in the groove of each drive pulley member to frictionally engage each drive pulley member and couple the drive pulley members together,
   the chain means having side contact surfaces on opposite sides thereof,
   the chain means engaging each drive pulley member with the side contact surfaces on one side of the chain means in contact with the pulley interior side contact surface on one side of each groove and with side contact surfaces on the other side of the chain means in contact with the drive pulley interior side contact surface on the other side of each groove,
   means permitting adjustable variation of the width of the chain means between its side contact surfaces over the length of the chain means,
   releasable locking means to lock the width of the chain means over sections of the chain means in engagement with each drive pulley member,
   control means to vary the width at which the locking means locks the width of the chain means about each drive pulley member,
   wherein with variation of the width at which the locking means locks the width of the chain means about one drive pulley member, the side contact surfaces of the chain means engage the interior side contact surfaces of the one drive pulley member at varying radii from the axis of the one drive pulley member, and
   wherein by variation of the width at which the chain means is locked about one drive pulley member relative to the width at which the chain means is locked about the other drive pulley member, the relative speeds of rotation of the drive pulley members are varied.

2. A transmission as claimed in claim 1 wherein the width of the chain means can be varied steplessly between minimum and maximum widths.

3. A transmission as claimed in claim 2 wherein the locking means locks the chain means when the chain means is curved in one direction and unlocks the chain means when the chain means is curved in the other direction, the chain means being curved in said one direction when it engages the drive pulley members.

4. A transmission as claimed in claim 3 wherein the chain means becomes locked as the chain means bends from being curved in the other direction to being curved in the one direction and the chain means becoming unlocked as the chain means bends from being curved in the one direction to being curved in the other direction.

5. A transmission as claimed in claim 3 wherein said chain means is biased to assume a maximum width, said control means guiding the chain means in an unlocked position into engagement with the pulley interior side contact surfaces so that the chain means becomes bent from being curved in the other direction to being curved in the one direction while it engages a drive pulley member at a desired radius, thereby locking the chain means at a desired width corresponding to said desired radius.

6. A transmission as claimed in claim 5 wherein said control means comprises:
two elongate control arms mounted for pivoting between their ends about pivot axes parallel the axis of the drive pulley members on opposite sides to a center plane through both axes of the drive pulley members,
each control arm carrying at its ends idler pulleys rotatable about axes parallel the axes of the drive pulley members,
the idler pulleys having a width less than the width between the pulley interior side contact surfaces of the drive pulley members so that the idler pulleys can be located between the pulley interior side contact surfaces of the drive pulley members,
each control arm pivotable about its pivot axis to move the idler pulley at one end radially closer to or farther from the axis of one drive pulley member while the idler pulley at its other end is conversely moved correspondingly farther from or closer to the axis of the other drive pulley member,
synchronous means coupling the two control arms together for synchronous pivoting to maintain the idler pulleys of both control arms nearest the same drive pulley member at equal radial distances from the axis thereof,
the chain means being curved in said one direction while it is engaged about the drive pulley means and being curved in said other direction while it it engaged about the idler pulleys.

7. A transmission as claimed in claim 6 wherein the chain means engages in repeated succession one drive pulley member, then a first idler pulley nearest the one drive pulley member, then a second idler pulley on the same control arm as the first idler pulley, then the other drive pulley member, then a third idler pulley nearest the other drive pulley member, then a fourth idler pulley on the same control arm as the third idler pulley and then returns to the one drive pulley member.

8. A transmission as claimed in claim 6 wherein the idler pulleys nearest each drive pulley member are located so that the chain means engages the contact surfaces of the drive pulley member over at least 180° about the axis of the drive pulley member.

9. A transmission as claimed in claim 3 wherein said chain means comprises:
link means interconnected by pin means for relative pivoting of adjacent links about each pin means on curving of the chain in said one or other direction,
said pin means including extendible members which are slidably extendible axially with respect to the pin means to increase and decrease the width of the chain means with outermost end surfaces of the extendible members comprising the side contact surfaces of the chain means,
said locking means releasably locking the extendible members relative to the pin means,
biasing means biasing the locking means to assume a locked relation, and
a cam element on each link means which when one link means is pivoted relative to an adjacent link means when said chain means is curved in said other direction displaces said locking means against the bias of the biasing means to unlock the extendible members.

10. A transmission as claimed in claim 9 wherein said locking means comprises a sprag mounted on the exterior of an extendible member for locking engagement therewith.

11. A transmission as claimed in claim 1 wherein said chain means comprises:
link means interconnected by pin means for relative pivoting of adjacent links about each pin means on curving of the chain in said one or other direction,
said pin means including extendible members which are slidably extendible axially with respect of the pin means to increase and decrease the width of the chain means with outermost end surfaces of the extendible members comprising the side contact surfaces of the chain means, 12. A continuously variable transmission comprising:
two pulley members each having a circumferential groove with opposed conical interior side contact surfaces, the pulley members rotatably journalled about spaced parallel axes with their grooves aligned,
closed-loop chain means passing about the pulley members received in the grooves thereabout to rotatably couple the pulley members by side contact surfaces of the chain means frictionally engaging the opposed contact surfaces of each drive pulley member,
the chain means having a width between its side contact surfaces which can be varied over its length,
releasable locking means to lock the width of the chain means while the chain means is engaged about each pulley member,
control means to vary the width at which the locking means locks the width of the chain means about each pulley means,
wherein with changes in the widths at which the chain means is locked at it engages the pulley members, the chain means engages the pulley members at varying radii thereby changing the speed ratio at which the pulley members rotate relative to each other.

* * * * *